United States Patent
Horita et al.

(10) Patent No.: US 9,658,365 B2
(45) Date of Patent: May 23, 2017

(54) OPTICAL MATERIAL COMPOSITION AND METHOD FOR PRODUCING SAME

(71) Applicant: MITSUBISHI GAS CHEMICAL COMPANY, INC., Tokyo (JP)

(72) Inventors: Akinobu Horita, Tokyo (JP); Yousuke Imagawa, Tokyo (JP); Teruo Kamura, Tokyo (JP); Hiroshi Horikoshi, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 15/031,450

(22) PCT Filed: Dec. 19, 2014

(86) PCT No.: PCT/JP2014/083639
§ 371 (c)(1),
(2) Date: Apr. 22, 2016

(87) PCT Pub. No.: WO2015/098718
PCT Pub. Date: Jul. 2, 2015

(65) Prior Publication Data
US 2016/0259091 A1 Sep. 8, 2016

(30) Foreign Application Priority Data

Dec. 26, 2013 (JP) .................. 2013-268676

(51) Int. Cl.
*C08G 65/32* (2006.01)
*G02B 1/04* (2006.01)
*C08G 75/08* (2006.01)
*C08L 71/02* (2006.01)

(52) U.S. Cl.
CPC ............. *G02B 1/041* (2013.01); *C08G 75/08* (2013.01); *G02B 1/04* (2013.01)

(58) Field of Classification Search
CPC ......... G02B 1/04; C08G 75/08; C07D 331/02
USPC ....... 528/44, 60, 68, 70, 374, 375, 377, 380; 525/403
See application file for complete search history.

(56) References Cited

U.S. PATENT DOCUMENTS

| 2005/0124783 A1 | 6/2005 | Morijiri et al. |
| 2014/0336332 A1 | 11/2014 | Jang et al. |
| 2015/0166720 A1 | 6/2015 | Okada et al. |
| 2015/0259477 A1* | 9/2015 | Kariyazono ........... C08G 75/08 528/378 |

FOREIGN PATENT DOCUMENTS

| JP | 09-110979 | 4/1997 |
| JP | 2001-002783 | 1/2001 |
| JP | 2004-137481 | 5/2004 |
| JP | 2005-298742 | 10/2005 |
| JP | 5505573 | 3/2014 |
| WO | 03/076496 | 9/2003 |
| WO | 2013/109118 | 7/2013 |

OTHER PUBLICATIONS

International Search Report issued in PCT Application No. PCT/JP201/083639, dated Mar. 24, 2015.

* cited by examiner

*Primary Examiner* — Terressa Boykin

(74) *Attorney, Agent, or Firm* — Greenblum & Bernstein, P.L.C.

(57) ABSTRACT

Through an optical material composition containing a compound (a), a compound (b), a polythiol (c) and sulfur (d) according to the present invention, good mold release properties are obtained, and the occurrence of separation mark defects can be suppressed.

Compound (a): a compound having the structure represented by formula (1):

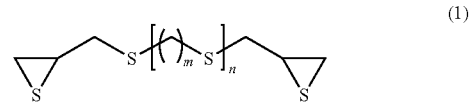

(1)

(In formula (1), m is an integer of 0 to 4 and n is an integer of 0 to 2.)

Compound (b): a compound having the structure represented by formula (2):

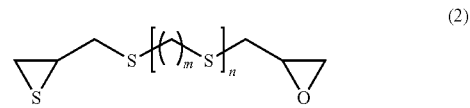

(2)

(In formula (2), m is an integer of 0 to 4 and n is an integer of 0 to 2.)

8 Claims, No Drawings

OPTICAL MATERIAL COMPOSITION AND METHOD FOR PRODUCING SAME

TECHNICAL FIELD

The present invention relates to a composition for optical materials, which is suitably used for an optical material for a plastic lens, a prism, an optical fiber, an information recording substrate, a filter or the like, in particular for a plastic lens, and a method for producing the composition for optical materials.

BACKGROUND ART

Plastic lenses are lightweight, highly tough and easy to be dyed. Properties particularly required for plastic lenses are: low specific gravity; high transparency; low yellowness; high refractive index and high Abbe number as optical properties; high heat resistance; high strength; and the like. A high refractive index allows a lens to be thinner, and a high Abbe number reduces the chromatic aberration of a lens.

Recently, many organic compounds having a sulfur atom to be used for providing a high refractive index and a high Abbe number have been reported. Among such compounds, polyepisulfide compounds having a sulfur atom are known to provide a good balance between the refractive index and the Abbe number (Patent Document 1). High refractive indexes of 1.7 or higher were achieved by optical materials obtained from polyepisulfide compounds of these inventions, but a material having a refractive index higher than those has been desired, and an optical material comprising an inorganic compound having a sulfur atom and/or a selenium atom has been proposed (e.g., Patent Document 2). With respect to optical materials obtained by introducing sulfur in a polyepisulfide compound, a method of deaerating a resin composition under specific conditions in advance to improve transparency and heat resistance has been reported (Patent Document 3).

PRIOR ART DOCUMENTS

Patent Documents

Patent Document 1: Japanese Laid-Open Patent Publication No. H09-110979
Patent Document 2: Japanese Laid-Open Patent Publication No. 2001-2783
Patent Document 3: Japanese Laid-Open Patent Publication No. 2004-137481

SUMMARY OF THE INVENTION

Problems to be Solved by the Invention

However, in the production of the above-described optical materials, particularly plastic lenses for eyeglasses, mold release characteristics are poor and the yield is reduced due to a defect where peeling traces are left, and the improvement thereof is required. When mold release characteristics are poor, molds or lenses are broken, resulting in reduction of the productivity. A defect where peeling traces are left is a defect where peeling traces are left on a lens when released from a mold after polymerization and curing, and when this occurs, it becomes impossible to use the product as a lens. Such a defect where peeling traces are left occurs particularly in the case of powerful minus lenses, and the improvement thereof has been desired.

That is, the problem to be solved by the present invention is to provide a composition for optical materials which can improve poor mold release characteristics or reduction in the yield due to a defect where peeling traces are left when producing an optical material having a high refractive index, a method for producing the composition for optical materials, a method for producing an optical material, an optical material and an optical lens. In particular, suppression of a defect where peeling traces are left in powerful minus lenses is provided.

Means for Solving the Problems

Under such circumstances, the present inventors diligently made researches and found that the above-described problems can be solved by the present invention described below. Specifically, the present invention is as follows:

<1> A composition for optical materials, which comprises a compound (a) below, a compound (b) below, a polythiol (c) and sulfur (d):

the compound (a): a compound having the structure represented by the following formula (1):

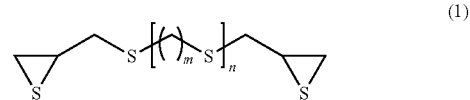

wherein m represents an integer from 0 to 4, and n represents an integer from 0 to 2; and the compound (b): a compound having the structure represented by the following formula (2):

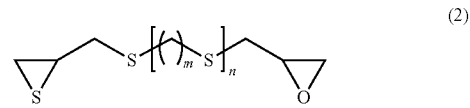

wherein m represents an integer from 0 to 4, and n represents an integer from 0 to 2.

<2> The composition for optical materials according to item <1>, wherein the polythiol (c) is at least one compound selected from the group consisting of bis(2-mercaptoethyl) sulfide, 2,5-dimercaptomethyl-1,4-dithiane, 1,3-bis(mercaptomethyl)benzene, 1,4-bis(mercaptomethyl)benzene, 4-mercaptomethyl-1,8-dimercapto-3,6-dithiaoctane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,3,3-tetrakis(mercaptomethylthio)propane, pentaerythritol tetrakis-mercaptopropionate, pentaerythritol tetrakis-thioglycolate, trimethylolpropane tris(thioglycolate) and trimethylolpropane tris(mercapto propionate).

<3> The composition for optical materials according to item <1> or <2>, wherein, when the total amount of the compound (a), the compound (b), the polythiol (c) and sulfur (d) is 100% by mass, the compound (a) is in an amount of 50 to 90% by mass; the compound (b) is in an amount of 0.05 to 20% by mass; the polythiol (c) is in an amount of 1 to 20% by mass; and sulfur (d) is in an amount of 8 to 50% by mass.

<4> A method for producing an optical material, which comprises adding a prepolymerization catalyst to the composition for optical materials according to any one of items <1> to <3> for preliminarily reacting the compound (a), the compound (b), the polythiol (c) and sulfur (d) in an amount of 0.0001 to 10% by mass relative to the total amount of (a) to (d).

<5> A method for producing an optical material, which comprises adding a polymerization catalyst to the composition for optical materials according to any one of items <1> to <3> to be polymerized and cured in an amount of 0.0001 to 10% by mass relative to the total amount of (a) to (d).

<6> An optical material obtained by the production method according to item <5>.

<7> An optical lens comprising the optical material according to item <6>.

<8> A method for producing the composition for optical materials according to any one of items <1> to <3>, which comprises:

reacting an epoxy compound represented by formula (3) below with thiourea to obtain a mixture of the compound (a) and the compound (b); and mixing the mixture with the polythiol (c) and the sulfur (d):

(3)

wherein m represents an integer from 0 to 4, and n represents an integer from 0 to 2.

Advantageous Effect of the Invention

By using the composition for optical materials of the present invention, it is possible to provide an optical material, which has a balance between a sufficiently high refractive index and a good Abbe number and can improve poor mold release characteristics or reduction in the yield due to a defect where peeling traces are left, which was difficult to obtain when using compounds of prior art as raw materials. In particular, it is possible to provide suppression of a defect where peeling traces are left in powerful minus lenses.

EMBODIMENTS FOR CARRYING OUT THE INVENTION

The present invention is a composition for optical materials comprising the compound (a), the compound (b), the polythiol (c) and sulfur (d).

Hereinafter, raw materials to be used in the present invention, i.e., the compound (a), the compound (b), the polythiol (c) (hereinafter sometimes referred to as "the compound (c)") and the sulfur (d) (hereinafter sometimes referred to as "the compound (d)") will be described in detail.

The compound (a) to be used in the present invention is a compound having the structure represented by the aforementioned formula (1). When the total amount of the compounds (a) to (d) is 100% by mass, the amount of the compound (a) to be added is usually 50 to 90% by mass, preferably 55 to 90% by mass, and particularly preferably 60 to 85% by mass.

Specific examples of the compound (a) include episulfides such as bis(β-epithiopropyl)sulfide, bis(β-epithiopropyl)disulfide, bis(β-epithiopropylthio)methane, 1,2-bis(β-epithiopropylthio)ethane, 1,3-bis(β-epithiopropylthio)propane and 1,4-bis(β-epithiopropylthio)butane. As the compound (a), such compounds may be used solely, or two or more of them may be used in combination.

Among the above-described compounds, bis(β-epithiopropyl)sulfide (n=0 in formula (1)) and bis(β-epithiopropyl)disulfide (m=0 and n=1 in formula (1)) are preferred, and bis(β-epithiopropyl)sulfide (n=0 in formula (1)) is most preferred.

The compound (b) to be used in the present invention is a compound having the structure represented by the aforementioned formula (2). When the total amount of the compounds (a) to (d) is 100% by mass, the amount of the compound (b) to be added is usually 0.05 to 20% by mass, preferably 0.05 to 15% by mass, more preferably 0.1 to 10% by mass, particularly preferably 0.5 to 5% by mass, and most preferably 0.5 to 4% by mass. When the amount of the compound (b) to be added is less than 0.05% by mass, poor mold release and peeling traces may be generated, and when the amount is more than 20% by mass, also poor mold release and peeling traces may be generated.

Specific examples of the compound (b) include β-epoxypropyl(β-epithiopropyl)sulfide, β-epoxypropyl(β-epithiopropyl)disulfide, β-epoxypropylthio(β-epithiopropylthio)methane, 1-(β-epoxypropylthio)-2-(β-epithiopropylthio)ethane, 1-(β-epoxypropylthio)-3-(β-epithiopropylthio)propane and 1-(β-epoxypropylthio)-4-(β-epithiopropylthio)butane. As the compound (b), such compounds may be used solely, or two or more of them may be used in combination.

Among the above-described compounds, β-epoxypropyl(β-epithiopropyl)sulfide (n=0 in formula (2)) and β-epoxypropyl(β-epithiopropyl)disulfide (m=0 and n=1 in formula (2)) are preferred, and β-epoxypropyl(β-epithiopropyl)sulfide (n=0 in formula (2)) is most preferred.

The compound of formula (1) and the compound of formula (2) can be obtained by reacting an epoxy compound represented by formula (3) below with thiourea:

(3)

wherein m represents an integer from 0 to 4, and n represents an integer from 0 to 2.

Note that when obtaining the compound of formula (1) by reacting the epoxy compound represented by formula (3) with thiourea, stopping the reaction in mid-course is a technique for obtaining the mixture of the compound of formula (1) and the compound of formula (2) efficiently. Specifically, the reaction is performed in the presence of an acid, acid anhydride or ammonium salt in a mixed solvent of a polar organic solvent, which can dissolve thiourea, and a non-polar organic solvent, which can dissolve the epoxy compound represented by formula (3), and the reaction is terminated before it is completed.

In the method for obtaining the compound of formula (1) and the compound of formula (2) by means of the reaction, thiourea is used in a mole number corresponding to epoxy of the epoxy compound represented by formula (3), i.e., a theoretical amount, but when importance is placed on the reaction rate and the purity, thiourea is used in the theoretical amount to 2.5 times the theoretical amount (mol). The amount is preferably from 1.3 times the theoretical amount (mol) to 2.0 times the theoretical amount (mol), and more preferably from 1.5 times the theoretical amount (mol) to 2.0 times the theoretical amount (mol). Examples of the polar organic solvent that can dissolve thiourea include alcohols such as methanol and ethanol, ethers such as diethyl ether, tetrahydrofuran and dioxane and hydroxy ethers such as methyl cellosolve, ethyl cellosolve and butyl cellosolve, and alcohols are preferred and methanol is most preferred. Examples of the non-polar organic solvent that can dissolve the epoxy compound represented by formula (3) include aliphatic hydrocarbons such as pentane, hexane and heptane, aromatic hydrocarbons such as benzene and toluene and halogenated hydrocarbons such as dichloromethane, chloroform and chlorobenzene, and aromatic hydrocarbons are preferred and toluene is most preferred. Regarding the solvent ratio, the volume ratio of the polar organic solvent/the non-polar organic solvent=0.1 to 10.0, and preferably, the volume ratio of the polar organic solvent/the non-polar organic solvent=0.2 to 5.0. When the volume ratio is less than 0.1, thiourea is not sufficiently dissolved and the reaction does not proceed sufficiently, and when the volume ratio is more than 10.0, polymer formation becomes pronounced. The reaction temperature is 10° C. to 30° C. When the reaction temperature is lower than 10° C., not only the reaction rate is reduced, but also thiourea is not sufficiently dissolved and the reaction does not proceed sufficiently, and when the temperature is higher than 30° C., polymer formation becomes pronounced. Specific examples of the acid or acid anhydride to be used include: inorganic acidic compounds such as nitric acid, hydrochloric acid, perchloric acid, hypochlorous acid, chlorine dioxide, hydrofluoric acid, sulfuric acid, fuming sulfuric acid, sulfuryl chloride, boric acid, arsenic acid, arsenious acid, pyroarsenic acid, phosphoric acid, phosphorous acid, hypophosphoric acid, phosphorus oxychloride, phosphorous oxybromide, phosphorus sulfide, phosphorus trichloride, phosphorus tribromide, phosphorus pentachloride, hydrocyanic acid, chromic acid, nitric anhydride, sulphuric anhydride, boron oxide, arsenic pentoxide, phosphorus pentoxide, chromic anhydride, silica gel, silica alumina, aluminium chloride and zinc chloride; organic carboxylic acids such as formic acid, acetic acid, peracetic acid, thioacetic acid, oxalic acid, tartaric acid, propionic acid, butyric acid, succinic acid, valeric acid, caproic acid, caprylic acid, naphthenic acid, methyl mercaptopropionate, malonic acid, glutaric acid, adipic acid, cyclohexanecarboxylic acid, thiodipropionic acid, dithiodipropionic acid, acetic acid, maleic acid, benzoic acid, phenylacetic acid, o-toluic acid, m-toluic acid, p-toluic acid, salicylic acid, 2-methoxybenzoic acid, 3-methoxybenzoic acid, benzoylbenzoic acid, phthalic acid, isophthalic acid, terephthalic acid, salicylic acid, benzilic acid, α-naphthalenecarboxylic acid, β-naphthalenecarboxylic acid, acetic anhydride, propionic anhydride, butyric anhydride, succinic anhydride, maleic anhydride, benzoic anhydride, phthalic anhydride, pyromellitic dianhydride, trimellitic anhydride and trifluoroacetic anhydride; phosphoric acids such as mono-, di- or trimethyl phosphate, mono-, di- or triethyl phosphate, mono-, di- or triisobutyl phosphate, mono-, di- or tributyl phosphate and mono-, di- or trilauryl phosphate, and phosphorous acids in which the phosphate moiety of any of the phosphoric acids is changed to a phosphite; organic phosphorous compounds such as dialkyl phosphorodithioates typified by dimethyl phosphorodithioate; phenols such as phenol, catechol, t-butyl catechol, 2,6-di-t-butyl cresol, 2,6-di-t-butyl ethylphenol, resorcin, hydroquinone, phloroglucin, pyrogallol, cresol, ethyl phenol, butyl phenol, nonyl phenol, hydroxyphenylacetic acid, hydroxyphenylpropionic acid, hydroxyphenylacetamide, methyl hydroxyphenylacetate, ethyl hydroxyphenylacetate, hydroxyphenethyl alcohol, hydroxyphenethyl amine, hydroxybenzaldehyde, phenylphenol, bisphenol A, 2,2'-methylene-bis(4-methyl-6-t-butyl phenol), bisphenol F, bisphenol S, α-naphthol, β-naphthol, aminophenol, chlorophenol and 2,4,6-trichlorophenol; and sulfonic acids such as methanesulfonic acid, ethanesulfonic acid, butanesulfonic acid, dodecanesulfonic acid, benzenesulfonic acid, o-toluenesulfonic acid, m-toluenesulfonic acid, p-toluenesulfonic acid, ethylbenzenesulfonic acid, butylbenzenesulfonic acid, dodecylbenzenesulfonic acid, p-phenolsulfonic acid, o-cresolsulfonic acid, metanilic acid, sulfanilic acid, 4B-acid, diaminostilbenesulfonic acid, biphenylsulfonic acid, α-naphthalenesulfonic acid, β-naphthalenesulfonic acid, peri acid, Laurent's acid and phenyl-J-acid. Several of them may be used in combination. Preferred are organic carboxylic acids such as formic acid, acetic acid, peracetic acid, thioacetic acid, oxalic acid, tartaric acid, propionic acid, butyric acid, succinic acid, valeric acid, caproic acid, caprylic acid, naphthenic acid, methyl mercaptopropionate, malonic acid, glutaric acid, adipic acid, cyclohexanecarboxylic acid, thiodipropionic acid, dithiodipropionic acid, acetic acid, maleic acid, benzoic acid, phenylacetic acid, o-toluic acid, m-toluic acid, p-toluic acid, salicylic acid, 2-methoxybenzoic acid, 3-methoxybenzoic acid, benzoylbenzoic acid, phthalic acid, isophthalic acid, terephthalic acid, salicylic acid, benzilic acid, α-naphthalenecarboxylic acid, β-naphthalenecarboxylic acid, acetic anhydride, propionic anhydride, butyric anhydride, succinic anhydride, maleic anhydride, benzoic anhydride, phthalic anhydride, pyromellitic dianhydride, trimellitic anhydride and trifluoroacetic anhydride. More preferred are acid anhydrides such as acetic anhydride, propionic anhydride, butyric anhydride, succinic anhydride, maleic anhydride, benzoic anhydride, phthalic anhydride, pyromellitic dianhydride, trimellitic anhydride and trifluoroacetic anhydride. Acetic anhydride is most preferred. The amount to be added is usually 0.001 to 10% by mass, and preferably 0.01 to 5% by mass relative to the total amount of the reaction solution. When the amount to be added is less than 0.001% by mass, polymer formation becomes pronounced, resulting in reduction in the yield of the reaction, and when the amount is more than 10% by mass, the yield is significantly reduced.

Specific examples of the ammonium salt include ammonium chloride, ammonium bromide, ammonium iodide, ammonium formate, ammonium acetate, propionic acid ammonium, ammonium benzoate, ammonium sulfate, ammonium nitrate, ammonium carbonate, ammonium phosphate and ammonium hydroxide. Ammonium nitrate, ammonium sulfate and ammonium chloride are more preferred, and ammonium nitrate is most preferred.

The reaction thereof is monitored by NMR, IR, liquid chromatograph or gas chromatograph, and the reaction is terminated in the state where the compound having the structure represented by formula (2) remains. The reaction is terminated in the state where the compound having the structure represented by formula (2) remains preferably in an amount of 0.05 to 20% by mass, more preferably in an amount of 0.1 to 15% by mass, particularly preferably in an amount of 0.5 to 10% by mass, and most preferably in an amount of 0.5 to 4% by mass.

When the total amount of the compounds (a) to (d) is 100% by mass, the amount of the polythiol (c) to be added in the present invention is usually 1 to 20% by mass, preferably 2 to 15% by mass, and particularly preferably 3 to 10% by mass. When the amount of the polythiol (c) to be added is less than 1% by mass, the oxidation resistance may be reduced, and when the amount is more than 20% by mass, the heat resistance may be reduced. As the polythiol (c) to be used in the present invention, compounds may be used solely, or two or more of them may be used in combination.

Specific examples thereof include methanedithiol, methanetrithiol, 1,2-dimercaptoethane, 1,2-dimercaptopropane, 1,3-dimercaptopropane, 2,2-dimercaptopropane, 1,4-dimercaptobutane, 1,6-dimercaptohexane, bis(2-mercaptoethyl)ether, bis(2-mercaptoethyl)sulfide, 1,2-bis(2-mercaptoethyloxy)ethane, 1,2-bis(2-mercaptoethylthio)ethane, 2,3-dimercapto-1-propanol, 1,3-dimercapto-2-propanol, 1,2,3-trimercaptopropane, 2-mercaptomethyl-1,3-dimercaptopropane, 2-mercaptomethyl-1,4-dimercaptobutane, 2-(2-mercaptoethylthio)-1,3-dimercaptopropane, 4-mercaptomethyl-1,8-dimercapto-3,6-dithiaoctane, 2,4-dimercaptomethyl-1,5-dimercapto-3-thiapentane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,1-tris(mercaptomethyl)propane, tetrakis(mercaptomethyl)methane, ethyleneglycol bis(2-mercaptoacetate), ethyleneglycol bis(3-mercaptopropionate), diethyleneglycol bis(2-mercaptoacetate), diethyleneglycol bis(3-mercaptopropionate), 1,4-butanediol bis(2-mercaptoacetate), 1,4-butanediol bis(3-mercaptopropionate), trimethylolpropane tris(thioglycolate), trimethylolpropane tris(mercapto propionate), pentaerythritol tetrakis-thioglycolate, pentaerythritol tetrakis-mercaptopropionate, 1,2-dimercaptocyclohexane, 1,3-dimercaptocyclohexane, 1,4-dimercaptocyclohexane, 1,3-bis(mercaptomethyl)cyclohexane, 1,4-bis(mercaptomethyl)cyclohexane, 2,5-dimercaptomethyl-1,4-dithiane, 2,5-dimercaptomethyl-1,4-dithiane, 2,5-bis(2-mercaptoethylthiomethyl)-1,4-dithiane, 2,5-dimercaptomethyl-1-thiane, 2,5-dimercaptoethyl-1-thiane, 2,5-dimercaptomethylthiophene, 1,2-dimercaptobenzene, 1,3-dimercaptobenzene, 1,4-dimercaptobenzene, 1,3-bis(mercaptomethyl)benzene, 1,4-bis(mercaptomethyl)benzene, 2,2'-dimercaptobiphenyl, 4,4'-dimercaptobiphenyl, bis(4-mercaptophenyl)methane, 2,2-bis(4-mercaptophenyl)propane, bis(4-mercaptophenyl)ether, bis(4-mercaptophenyl)sulfide, bis(4-mercaptophenyl)sulfone, bis(4-mercaptomethylphenyl)methane, 2,2-bis(4-mercaptomethylphenyl)propane, bis(4-mercaptomethylphenyl)ether, bis(4-mercaptomethylphenyl)sulfide, 2,5-dimercapto-1,3,4-thiadiazole, 3,4-thiophenedithiol and 1,1,3,3-tetrakis(mercaptomethylthio)propane.

Among them, bis(2-mercaptoethyl)sulfide, 2,5-dimercaptomethyl-1,4-dithiane, 1,3-bis(mercaptomethyl)benzene, 1,4-bis(mercaptomethyl)benzene, 4-mercaptomethyl-1,8-dimercapto-3,6-dithiaoctane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,3,3-tetrakis(mercaptomethylthio)propane, pentaerythritol tetrakis-mercaptopropionate, pentaerythritol tetrakis-thioglycolate, trimethylolpropane tris(thioglycolate) and trimethylolpropane tris(mercapto propionate) are preferred, bis(2-mercaptoethyl)sulfide, 2,5-bis(2-mercaptomethyl)-1,4-dithiane, 4-mercaptomethyl-1,8-dimercapto-3,6-dithiaoctane, 1,3-bis(mercaptomethyl)benzene, pentaerythritol tetrakis-mercaptopropionate and pentaerythritol tetrakis-thioglycolate are more preferred, and bis(2-mercaptoethyl)sulfide, 2,5-dimercaptomethyl-1,4-dithiane, 4-mercaptomethyl-1,8-dimercapto-3,6-dithiaoctane and 1,3-bis(mercaptomethyl)benzene are most preferred.

When the total amount of the compounds (a) to (d) is 100% by mass, the amount of the sulfur (d) to be added in the present invention is usually 8 to 50% by mass, preferably 8 to 48.95% by mass, more preferably 10 to 45% by mass, and particularly preferably 15 to 40% by mass.

The sulfur to be used in the present invention may be in any form. Specifically, the sulfur is finely-powdered sulfur, colloidal sulfur, precipitated sulfur, crystalline sulfur, sublimed sulfur or the like, and is preferably finely-powdered sulfur having fine particles.

The sulfur to be used in the present invention may be produced by any production method. Examples of methods for producing sulfur include methods of sublimation and purification from natural sulfur ores, methods of mining underground sulfur by means of the melting method, and methods of recovery using, for example, hydrogen sulfide obtained in the process of desulfurization of petroleum oil, natural gas or the like, as a raw material, but any of these production methods may be employed.

It is preferred that the particle size of the sulfur to be used in the present invention is less than 10 mesh, that is, the sulfur is in the form of fine powder having a particle size of less than 10 mesh. When the particle size of the sulfur is more than 10 mesh, it is difficult to dissolve the sulfur completely. For this reason, an undesirable reaction and the like may be caused in the first step to generate a defect. The particle size of the sulfur is more preferably less than 30 mesh, and most preferably less than 60 mesh.

The purity of the sulfur to be used in the present invention is preferably at least 98%, more preferably at least 99.0%, even more preferably at least 99.5%, and most preferably at least 99.9%. When the purity of the sulfur is at least 98%, the color tone of the obtained optical material is improved compared to the case of lower than 98%.

It is also possible to preliminarily react a part or all of each of the compound (a), the compound (b), the polythiol (c) and sulfur (d) at −100 to 160° C. over 0.1 to 480 hours prior to cast molding in the presence or absence of a prepolymerization catalyst with or without stirring to subsequently prepare the composition for optical materials. Particularly when a solid content is contained in compounds in the composition for optical materials and this causes difficulty in handling, this preliminary reaction is effective.

As the prepolymerization catalyst to be used in the present invention, imidazoles, phosphines, thioureas, quaternary ammonium salts, quaternary phosphonium salts, tertiary sulfonium salts, secondary iodonium salts and hindered amines are preferred, and more preferred are imidazoles and hindered amines which have good compatibility with the composition.

Specific examples of more preferred prepolymerization catalysts include: imidazoles such as N-benzylimidazole, 4-methylimidazole, 4-ethylimidazole, 1-phenylimidazole and 2-methyl-N-methylimidazole; and hindered amines such as 1,2,2,6,6-pentamethylpiperidyl methacrylate, 1,2,2,6,6-pentamethylpiperidyl acrylate and 1,2,2,6,6-pentamethylpiperidyl-4-vinylbenzoate. Among them, even more preferred are 2-methyl-N-imidazole and 1,2,2,6,6-pentamethylpiperidyl methacrylate.

The amount of the prepolymerization catalyst to be added cannot be determined categorically because it varies depending on the components of the composition, the mixing ratio and the method for polymerization and curing, but the amount is usually 0.0001% by mass to 10% by mass, and preferably 0.003% by mass to 3.0% by mass when the total amount of the compound (a), the compound (b), the polythiol (c) and sulfur (d) is 100% by mass. When the amount of the prepolymerization catalyst to be added is more than 10% by mass, oxidation resistance may be reduced. When the amount of the prepolymerization catalyst to be added is less than 0.0001% by mass, the preliminary reaction may not proceed sufficiently.

Conditions for this preliminary reaction are preferably −10 to 120° C. and 0.1 to 240 hours, more preferably 0 to 100° C. and 0.1 to 120 hours, and particularly preferably 20 to 80° C. and 0.1 to 60 hours. Preferably 10 to 90%, more preferably 30 to 80%, and particularly preferably 50 to 70% of the sulfur (d) (the amount of the sulfur before the reaction is regarded as 0%) is reacted by this preliminary reaction. The preliminary reaction may be performed in any atmosphere, for example, in the presence of a gas such as air, nitrogen and oxygen, under ordinary pressure or elevated pressure, under reduced pressure, or the like. When the reaction is performed under reduced pressure, the reaction usually proceeds more moderately compared to ordinary pressure because hydrogen sulfide which promotes the reaction is removed. In addition, this preliminary reaction may be performed with the addition of the polythiol (c), a compound which can react with a part or all of auxiliary materials to be used as performance modifiers, and additives such as an ultraviolet absorber. Further, regarding this preliminary composition for optical materials, a technique of measuring liquid chromatography and/or viscosity and/or specific gravity and/or refractive index is preferred because of high sensitivity, and a technique of measuring refractive index is most preferred because it is simple and easy. For the measurement, an in-line type apparatus is conveniently used because the reaction can be monitored thereby without time difference. In particular, it is effective in the case of sealing under reduced pressure or elevated pressure because taking out a sample can be omitted. For example, in the case of measuring the refractive index, in conventional and general techniques, sampling of a composition for optical materials is performed and an Abbe refractometer or Pulfrich refractometer is used, but the reaction can be tracked without time difference by the measurement using an in-line type refractometer. Specifically, the detection unit of the refractometer is immersed in a composition for optical materials subjected to the preliminary reaction or deaeration treatment in advance, thereby measuring the refractive index of the reaction solution continuously. The refractive index increases as the reaction proceeds. Therefore, when the reaction is controlled at a desired refractive index, a constant reaction rate can be obtained with high accuracy, and a homogeneous composition for optical materials can be produced.

Since the refractive index varies depending on temperature, when sampling is performed and then the measurement is carried out, it is important to control a sample and a portion to be detected at a constant base temperature. In the case of an in-line system, the temperature of a portion to be detected varies, and therefore, it is required to obtain the relationship between the temperature of the portion to be detected and the refractive index in advance. The relationship between the measurement temperature, refractive index and refractive index at the base temperature can be easily obtained by multiple regression. Accordingly, it is preferred to use a refractometer with temperature correction function which can provide automatic conversion to the refractive index at the base temperature.

Examples of the in-line type refractometer include, but are not limited to, systems in which the angle of prism reflection light can be identified by a CCD cell using a light-emitting diode as a light source.

In the method for producing an optical material of the present invention, it is surely possible to add publicly-known additives such as an antioxidant, a blueing agent, an ultraviolet absorber and a deodorizer to further improve practicability of the optical material obtained.

The composition for optical materials can be subjected to the deaeration treatment in advance. The deaeration treatment can be carried out under reduced pressure before, during or after mixing the compound (a), the compound (b), the polythiol (c), sulfur (d), a compound which can react with a part or all of the components of the composition, a polymerization catalyst, a polymerization modifier and an additive. Preferably, the deaeration treatment is carried out under reduced pressure during or after mixing. The treatment conditions are as follows: under a reduced pressure of 0.001 to 100 Torr; 1 minute to 24 hours; and 0° C. to 100° C. The degree of pressure reduction is preferably 0.005 to 50 Torr, and more preferably 0.01 to 30 Torr. The degree of pressure reduction may be varied within these ranges. The deaeration time is preferably 5 minutes to 18 hours, and more preferably 10 minutes to 12 hours. The temperature at the time of deaeration is preferably 5 to 80° C., more preferably 10 to 60° C., and the temperature may be varied within these ranges. The operation of renewing the interface of the composition for optical materials by means of stirring, blowing a gas, vibration caused by ultrasonic wave or the like during the deaeration treatment is preferable in terms of the enhancement of the deaeration effect.

The measurement of liquid chromatography and/or viscosity and/or specific gravity and/or refractive index of the composition for optical materials subjected to the deaeration treatment is preferred for producing a constant optical material. In particular, a technique of measuring viscosity and/or refractive index is preferred because of high sensitivity, and a technique of measuring refractive index is most preferred because it is simple and easy. Also in this case, use of an in-line type refractometer is effective because the progression rate of deaeration can be tracked thereby without time difference. Specifically, since the refractive index is increased by deaeration, when deaeration is controlled at a desired refractive index, the deaeration process can be managed with high accuracy, and a homogeneous optical material can be produced.

As in the case of the preliminary reaction, since the refractive index varies depending on temperature, when sampling is performed and then the measurement is carried out, it is important to control a sample and a portion to be detected at a constant base temperature. Further, an in-line type refractometer can be suitably used according to the aforementioned operation method.

When obtaining an optical material by polymerizing and curing the composition for optical materials of the present invention, it is preferred to add a polymerization catalyst to the compound (a), the compound (b), the polythiol (c) and sulfur (d). As the polymerization catalyst, phosphines, thioureas, quaternary ammonium salts, quaternary phosphonium salts, tertiary sulfonium salts and secondary iodonium salts are preferred. Among them, quaternary ammonium salts and quaternary phosphonium salts, which have good compatibility with the composition, are more preferred, and quaternary ammonium salts are even more preferred.

Specific examples of more preferred polymerization catalysts include quaternary ammonium salts such as tetra-n-butylammonium bromide, triethylbenzyl ammonium chloride, cetyldimethylbenzyl ammonium chloride and 1-n-dodecyl pyridinium chloride and quaternary phosphonium salts such as tetra-n-butylphosphonium bromide and tetraphenyl phosphonium bromide. Among them, even more preferred are tetra-n-butylphosphonium bromide and triethylbenzyl ammonium chloride, and still more preferred is triethylbenzyl ammonium chloride. Examples of the polymerization catalyst to be used at the time of polymerizing and curing the composition for optical materials are listed as above, but the polymerization catalyst is not limited to the listed compounds as long as polymerization effects are exerted thereby. Further, these compounds may be used solely, or two or more of them may be used in combination.

The amount of the polymerization catalyst to be added cannot be determined categorically because it varies depending on the components of the composition, the mixing ratio and the method for polymerization and curing, but the amount is usually 0.0001% by mass to 10% by mass, preferably 0.001% by mass to 5% by mass, more preferably 0.01% by mass to 1% by mass, and most preferably 0.01% by mass to 0.5% by mass when the total amount of the compound (a), the compound (b), the polythiol (c) and sulfur (d) is 100% by mass. When the amount of the polymerization catalyst to be added is more than 10% by mass, the composition may be rapidly polymerized and colored. When the amount of the polymerization catalyst to be added is less than 0.0001% by mass, the composition for optical materials may be insufficiently cured, resulting in poor heat resistance.

Moreover, in the production of the optical material according to the production method of the present invention, it is surely possible to add publicly-known additives such as an antioxidant, an ultraviolet absorber, a yellowing inhibitor, a blueing agent and a pigment to the compound (a), the compound (b), the polythiol (c) and sulfur (d) to further improve practicability of the optical material obtained.

Preferred examples of the antioxidant include phenol derivatives. Among them, polyhydric phenols and halogen-substituted phenols are preferred compounds, and catechol, pyrogallol and alkyl-substituted catechols are more preferred compounds, and catechol is the most preferred compound.

Preferred examples of the ultraviolet absorber include benzotriazole-based compounds, and 2-(2-hydroxy-5-methylphenyl)-2H-benzotriazol, 5-chloro-2-(3,5-di-tert-butyl-2-hydroxyphenyl)-2H-benzotriazol, 2-(2-hydroxy-4-octylphenyl)-2H-benzotriazol, 2-(2-hydroxy-4-methoxyphenyl)-2H-benzotriazol, 2-(2-hydroxy-4-ethoxyphenyl)-2H-benzotriazol, 2-(2-hydroxy-4-butoxyphenyl)-2H-benzotriazol, 2-(2-hydroxy-4-octyloxyphenyl)-2H-benzotriazol and 2-(2-hydroxy-5-t-octylphenyl)-2H-benzotriazol are particularly preferred compounds.

The amount of each of the antioxidant and the ultraviolet absorber to be added is usually 0.01 to 5% by mass when the total amount of the compounds (a) to (d) is 100% by mass.

When polymerizing and curing the composition for optical materials, for the purpose of extension of the pot life, dispersion of heat generated by polymerization, etc., a polymerization modifier may be added to the compound (a), the compound (b), the polythiol (c) and sulfur (d) according to need. Examples of the polymerization modifier include halides of groups 13 to 16 of the long form of the periodic table. Among them, halides of silicon, germanium, tin and antimony are preferred, and chlorides of germanium, tin and antimony, which have an alkyl group, are more preferred. Further, dibutyltin dichloride, butyltin trichloride, dioctyltin dichloride, dichloride are even more preferred, and dibutyltin dichloride is the most preferred compound. These polymerization modifiers may be used solely, or two or more of them may be used in combination.

The amount of the polymerization modifier to be added is usually 0.0001 to 5.0% by mass, preferably 0.0005 to 3.0% by mass, and more preferably 0.001 to 2.0% by mass when the total amount of the compounds (a) to (d) is 100% by mass. When the amount of the polymerization modifier to be added is less than 0.0001% by mass, sufficient pot life cannot be ensured in the obtained optical material, and when the amount of the polymerization modifier to be added is more than 5.0% by mass, the composition for optical materials may not be sufficiently cured, and the heat resistance of the obtained optical material may be reduced.

Moreover, adding an epoxy compound other than the compound (b) to provide the composition for optical materials is also an effective means for increasing the homogeneity of the optical material. Specific examples of the epoxy compound include: phenol-based epoxy compounds produced by condensation of epihalohydrin with an aromatic hydroxy compound such as phenol and bisphenol A; alcohol-based epoxy compounds produced by condensation of epihalohydrin with an alcohol compound; glycidyl ester-based epoxy compounds produced by condensation of epihalohydrin with a carboxylic acid compound; amine-based epoxy compounds produced by condensation of epihalohydrin with an amine; epoxy compounds produced by oxidation and epoxidation of an unsaturated compound; and urethane-based epoxy compounds produced from an alcohol, phenol compound and diisocyanate, glycidol, etc. Among them, preferred are phenol-based epoxy compounds, and most preferred is diglycidyl ether of bisphenol A. The amount of the epoxy compound to be added is usually 0.0001 to 5% by mass when the total amount of the compounds (a) to (d) is 100% by mass.

The composition for optical materials thus obtained is injected into a mold or the like and polymerized to obtain an optical material.

At the time of cast-molding the composition for optical materials of the present invention, it is preferred to filter and remove impurities using, for example, a filter having a pore diameter of about 0.1 to 5 μm in terms of improving the quality of the optical material of the present invention.

The composition for optical materials of the present invention is usually polymerized as described below. Specifically, the curing time is usually 1 to 100 hours, and the curing temperature is usually −10° C. to 140° C. The polymerization is conducted by carrying out a step of retaining the composition at a predetermined polymerization temperature for a predetermined amount of time, a step of increasing the temperature at a rate of 0.1° C. to 100° C./h and a step of decreasing the temperature at a rate of 0.1° C. to 100° C./h, or a combination of these steps.

Further, it is preferred to anneal the obtained optical material at a temperature of 50 to 150° C. for about 10 minutes to 5 hours after curing is completed in terms of eliminating distortion of the optical material of the present invention. Moreover, the obtained optical material may be subjected to a surface treatment such as dyeing, hard coating, impact-resistant coating, antireflection treatment and imparting antifog properties according to need.

EXAMPLES

Hereinafter, the present invention will be specifically described by way of working examples and comparative examples. However, the present invention is not limited to the below-described working examples.

The mold release characteristics and the defect where peeling traces are left on each of optical materials obtained by methods of the below-described working examples and comparative examples were evaluated in manners described below.

A composition for optical materials was injected into a lens mold composed of two glass plates and a tape, and the temperature was gradually elevated from 10° C. to 60° C. over 30 hours, then held at 60° C. for 7 hours, then elevated to 100° C. over 4 hours, and then held at 100° C. for 4 hours to polymerize and cure the composition. After cooling, release from the mold was evaluated. 10 products were produced, and the case where poor mold release was not found on every product was rated as "A", the case where poor mold release was found on 1 product was rated as "B", the case where poor mold release was found on 2 products was rated as "C", and the case where poor mold release was found on 3 or more products was rated as "D". A, B and C are regarded as acceptable, but A and B are preferred, and A is particularly preferred.

Regarding peeling traces, the obtained product was released from the mold and annealed at 120° C. for 30 minutes, and after that, the surface condition thereof was visually observed. 10 products were produced, and the case where no peeling trace was left on every product was rated as "A", the case where peeling traces were left on 1 product was rated as "B", the case where peeling traces were left on 2 products was rated as "C", and the case where peeling traces were left on 3 or more products was rated as "D". A, B and C are regarded as acceptable, but A and B are preferred, and A is particularly preferred.

Example 1

Step (1): 78.95 parts by weight of (a) bis(β-epithiopropyl)sulfide (hereinafter referred to as "the compound (a-1)"), 0.05 parts by weight of (b) β-epoxypropyl(β-epithiopropyl)sulfide (hereinafter referred to as "the compound (b-1)"), 14 parts by weight of (d) sulfur (hereinafter referred to as "the compound (d-1)"), and 1.3 parts by weight of 2-(2-hydroxy-5-t-octylphenyl)-2H-benzotriazol as an ultraviolet absorber were put into a reactor, and the mixture was stirred at 60° C. until dissolution was completed. Subsequently, to this mixture, 0.5 parts by weight of 2-mercapto-1-methylimidazole as a preliminary reaction catalyst was added, and the mixture was preliminarily reacted at 60° C. for 50 minutes and then cooled to 20° C. The reaction solution thus obtained is referred to as "the preliminary reaction solution".
Step (2): Separately from Step (1), 7 parts by weight of (c) bis(2-mercaptoethyl)sulfide (hereinafter referred to as "the compound (c-1)"), 0.2 parts by weight of dibutyltin dichloride as a reaction modifier and 0.03 parts by weight of triethylbenzyl ammonium chloride as a curing catalyst were mixed together at 20° C. to provide a homogeneous solution.
Step (3): The homogeneous solution obtained in Step (2) was added to and mixed with the preliminary reaction solution obtained in Step (1), and the mixture was subjected to defoaming at 20° C. under a reduced pressure of 20 Torr for 80 minutes to obtain a composition for optical materials.
Step (4): The composition for optical materials obtained in Step (3) was injected into a mold for a semifinished lens having a mold diameter of 75 mm, a central thickness of 7 mm and an edge thickness of 15 mm (mold X) and a mold for a minus lens having a mold diameter of 75 mm, a central thickness of 1 mm and an edge thickness of 10 mm (mold Y), each of which was composed of two glass plates and a tape, while being filtered with a PTFE (polytetrafluoroethylene) filter having a pore diameter of 1 μm. After injection, the temperature of the composition for optical materials in each of the molds was gradually elevated from 10° C. to 60° C. over 30 hours, then held at 60° C. for 7 hours, subsequently elevated to 100° C. over 4 hours, and then held at 100° C. for 4 hours to polymerize and cure the composition. After cooling, the obtained products were released from the molds, thereby obtaining cured optical materials. The obtained optical materials were annealed at 120° C. for 30 minutes, and after distortion caused by mold release was eliminated, the surface condition thereof was visually observed. The results regarding mold release characteristics and peeling traces of the obtained optical materials are shown in Table 1.

Example 2

The process was carried out in a manner similar to that in Example 1, except that 78.3 parts by weight of (a) the compound (a-1) and 0.7 parts by weight of (b) the compound (b-1) were used. The results regarding mold release characteristics and peeling traces of the obtained optical materials are shown in Table 1.

Example 3

The process was carried out in a manner similar to that in Example 1, except that 77 parts by weight of (a) the compound (a-1) and 2 parts by weight of (b) the compound (b-1) were used. The results regarding mold release characteristics and peeling traces of the obtained optical materials are shown in Table 1.

Example 4

The process was carried out in a manner similar to that in Example 1, except that 71 parts by weight of (a) the compound (a-1) and 8 parts by weight of (b) the compound (b-1) were used. The results regarding mold release characteristics and peeling traces of the obtained optical materials are shown in Table 1.

Example 5

The process was carried out in a manner similar to that in Example 1, except that 68 parts by weight of (a) the compound (a-1) and 11 parts by weight of (b) the compound (b-1) were used. The results regarding mold release characteristics and peeling traces of the obtained optical materials are shown in Table 1.

Example 6

The process was carried out in a manner similar to that in Example 1, except that (a) bis(β-epithiopropyl)disulfide (hereinafter referred to as "the compound (a-2)") was used instead of the compound (a-1) and (b) β-epoxypropyl(β-epithiopropyl)disulfide (hereinafter referred to as "the compound (b-2)") was used instead of the compound (b-1). The results regarding mold release characteristics and peeling traces of the obtained optical materials are shown in Table 1.

Comparative Example 1

The process was carried out in a manner similar to that in Example 1, except that (a) 79 parts by weight of the compound (a-1) was used without addition of the compound (b). The results regarding mold release characteristics and peeling traces of the obtained optical materials are shown in Table 1. Since the compound (b) was not used, mold release characteristics were deteriorated and peeling traces were generated.

eliminated, the surface condition thereof was visually observed. The results regarding mold release characteristics and peeling traces of the obtained optical materials are shown in Table 2.

TABLE 1

| Examples Comparative Examples | Composition (parts by weight) | | | | | | Mold X | | Mold Y | |
|---|---|---|---|---|---|---|---|---|---|---|
| | a-1 | a-2 | b-1 | b-2 | c-1 | d-1 | mold release characteristics | peeling traces | mold release characteristics | peeling traces |
| Example 1 | 78.95 | 0 | 0.05 | 0 | 7 | 14 | A | B | A | B |
| Example 2 | 78.3 | 0 | 0.7 | 0 | 7 | 14 | A | A | A | A |
| Example 3 | 77 | 0 | 2 | 0 | 7 | 14 | A | A | A | A |
| Example 4 | 71 | 0 | 8 | 0 | 7 | 14 | B | A | B | B |
| Example 5 | 68 | 0 | 11 | 0 | 7 | 14 | B | B | B | C |
| Example 6 | 0 | 78.95 | 0 | 0.05 | 7 | 14 | A | A | A | A |
| Comparative Example 1 | 79 | 0 | 0 | 0 | 7 | 14 | D | D | D | D |

Example 7

Step (1): 78.45 parts by weight of (a) bis(β-epithiopropyl) sulfide (hereinafter referred to as "the compound (a-1)"), 0.05 parts by weight of (b) β-epoxypropyl(β-epithiopropyl) sulfide (hereinafter referred to as "the compound (b-1)"), 2.5 parts by weight of (c) m-xylylenedithiol (hereinafter referred to as "the compound (c-2)"), 14.3 parts by weight of (d) sulfur (hereinafter referred to as "the compound (d-1)"), and 1.4 parts by weight of 2-(4-butoxy-2-hydroxyphenyl)-2H-benzotriazol as an ultraviolet absorber were put into a reactor, and the mixture was stirred at 60° C. until dissolution was completed. Subsequently, to this mixture, 0.2 parts by weight of 2-mercapto-1-methylimidazole as a preliminary reaction catalyst was added, and the mixture was preliminarily reacted at 60° C. for 100 minutes and then cooled to 20° C. The reaction solution thus obtained is referred to as "the preliminary reaction solution".

Step (2): Separately from Step (1), 4.7 parts by weight of (c) the compound (c-2), 0.2 parts by weight of dibutyltin dichloride as a reaction modifier and 0.02 parts by weight of triethylbenzyl ammonium chloride as a curing catalyst were mixed together at 20° C. to provide a homogeneous solution.

Step (3): The homogeneous solution obtained in Step (2) was added to and mixed with the preliminary reaction solution obtained in Step (1), and the mixture was subjected to defoaming at 20° C. under a reduced pressure of 20 Torr for 15 minutes to obtain a composition for optical materials.

Step (4): The composition for optical materials obtained in Step (3) was injected into a mold for a semifinished lens having a mold diameter of 75 mm, a central thickness of 7 mm and an edge thickness of 15 mm (mold X) and a mold for a minus lens having a mold diameter of 75 mm, a central thickness of 1 mm and an edge thickness of 10 mm (mold Y), each of which was composed of two glass plates and a tape, while being filtered with a PTFE (polytetrafluoroethylene) filter having a pore diameter of 1 μm. After injection, the temperature of the composition for optical materials in each of the molds was gradually elevated from 10° C. to 60° C. over 30 hours, then held at 60° C. for 7 hours, subsequently elevated to 100° C. over 4 hours, and then held at 100° C. for 4 hours to polymerize and cure the composition. After cooling, the obtained products were released from the molds, thereby obtaining cured optical materials. The obtained optical materials were annealed at 120° C. for 30 minutes, and after distortion caused by mold release was Example 8

The process was carried out in a manner similar to that in Example 7, except that 77.8 parts by weight of (a) the compound (a-1) and 0.7 parts by weight of (b) the compound (b-1) were used. The results regarding mold release characteristics and peeling traces of the obtained optical materials are shown in Table 2.

Example 9

The process was carried out in a manner similar to that in Example 7, except that 76.5 parts by weight of (a) the compound (a-1) and 2 parts by weight of (b) the compound (b-1) were used. The results regarding mold release characteristics and peeling traces of the obtained optical materials are shown in Table 2.

Example 10

The process was carried out in a manner similar to that in Example 7, except that 70.5 parts by weight of (a) the compound (a-1) and 8 parts by weight of (b) the compound (b-1) were used. The results regarding mold release characteristics and peeling traces of the obtained optical materials are shown in Table 2.

Example 11

The process was carried out in a manner similar to that in Example 7, except that 67.5 parts by weight of (a) the compound (a-1) and 11 parts by weight of (b) the compound (b-1) were used. The results regarding mold release characteristics and peeling traces of the obtained optical materials are shown in Table 2.

Comparative Example 2

The process was carried out in a manner similar to that in Example 7, except that 78.5 parts by weight of (a) the compound (a-1) was used without addition of the compound (b). The results regarding mold release characteristics and peeling traces of the obtained optical materials are shown in Table 2. Since the compound (b) was not used, mold release characteristics were deteriorated and peeling traces were generated.

TABLE 2

| Examples Comparative Examples | Composition (parts by weight) | | | | Mold X | | Mold Y | |
|---|---|---|---|---|---|---|---|---|
| | a-1 | b-1 | c-2 | d-1 | mold release characteristics | peeling traces | mold release characteristics | peeling traces |
| Example 7 | 78.45 | 0.05 | 7.2 | 14.3 | A | B | A | B |
| Example 8 | 77.8 | 0.7 | 7.2 | 14.3 | A | A | A | A |
| Example 9 | 76.5 | 2 | 7.2 | 14.3 | A | A | A | A |
| Example 10 | 70.5 | 8 | 7.2 | 14.3 | B | A | B | B |
| Example 11 | 67.5 | 11 | 7.2 | 14.3 | B | B | B | C |
| Comparative Example 2 | 78.5 | 0 | 7.2 | 14.3 | D | D | D | D |

Example 12

Step (1): 76.35 parts by weight of (a) bis(β-epithiopropyl)sulfide (hereinafter referred to as "the compound (a-1)"), 0.05 parts by weight of (b) β-epoxypropyl(β-epithiopropyl)sulfide (hereinafter referred to as "the compound (b-1)"), 8.3 parts by weight of (c) bis(2-mercaptoethyl)sulfide (hereinafter referred to as "the compound (c-1)"), 14.5 parts by weight of (d) sulfur (hereinafter referred to as "the compound (d-1)"), and 1.4 parts by weight of 2-(4-butoxy-2-hydroxyphenyl)-2H-benzotriazol as an ultraviolet absorber were put into a reactor, and the mixture was stirred at 35° C. for 30 minutes. Subsequently, to this mixture, 0.02 parts by weight of 1,2,2,6,6-pentamethylpiperidyl methacrylate as a preliminary reaction catalyst was added, and the mixture was preliminarily reacted at 35° C. for 60 minutes. The reaction solution thus obtained is referred to as "the preliminary reaction solution".

Step (2): Separately from Step (1), 0.8 parts by weight of (c) the compound (c-1), 0.2 parts by weight of dibutyltin dichloride as a reaction modifier and 0.02 parts by weight of triethylbenzyl ammonium chloride as a curing catalyst were mixed together at 20° C. to provide a homogeneous solution.

Step (3): The homogeneous solution obtained in Step (2) was added to and mixed with the preliminary reaction solution obtained in Step (1), and the mixture was cooled to 20° C. over 20 minutes with the pressure being reduced to 10 Torr, and the mixture was further subjected to cooling and defoaming for 40 minutes, thereby obtaining a composition for optical materials.

Step (4): The composition for optical materials obtained in Step (3) was injected into a mold for a semifinished lens having a mold diameter of 75 mm, a central thickness of 7 mm and an edge thickness of 15 mm (mold X) and a mold for a minus lens having a mold diameter of 75 mm, a central thickness of 1 mm and an edge thickness of 10 mm (mold Y), each of which was composed of two glass plates and a tape, while being filtered with a PTFE (polytetrafluoroethylene) filter having a pore diameter of 1 μm. After injection, the temperature of the composition for optical materials in each of the molds was gradually elevated from 10° C. to 60° C. over 30 hours, then held at 60° C. for 7 hours, subsequently elevated to 100° C. over 4 hours, and then held at 100° C. for 4 hours to polymerize and cure the composition. After cooling, the obtained products were released from the molds, thereby obtaining cured optical materials. The obtained optical materials were annealed at 120° C. for 30 minutes, and after distortion caused by mold release was eliminated, the surface condition thereof was visually observed. The results regarding mold release characteristics and peeling traces of the obtained optical materials are shown in Table 3.

Example 13

The process was carried out in a manner similar to that in Example 12, except that 75.7 parts by weight of (a) the compound (a-1) and 0.7 parts by weight of (b) the compound (b-1) were used. The results regarding mold release characteristics and peeling traces of the obtained optical materials are shown in Table 3.

Example 14

The process was carried out in a manner similar to that in Example 12, except that 72.4 parts by weight of (a) the compound (a-1) and 4 parts by weight of (b) the compound (b-1) were used. The results regarding mold release characteristics and peeling traces of the obtained optical materials are shown in Table 3.

Example 15

The process was carried out in a manner similar to that in Example 12, except that 68.4 parts by weight of (a) the compound (a-1) and 8 parts by weight of (b) the compound (b-1) were used. The results regarding mold release characteristics and peeling traces of the obtained optical materials are shown in Table 3.

Example 16

The process was carried out in a manner similar to that in Example 12, except that 65.4 parts by weight of (a) the compound (a-1) and 11 parts by weight of (b) the compound (b-1) were used. The results regarding mold release characteristics and peeling traces of the obtained optical materials are shown in Table 3.

Comparative Example 3

The process was carried out in a manner similar to that in Example 12, except that 76.4 parts by weight of (a) the compound (a-1) was used without addition of the compound (b). The results regarding mold release characteristics and peeling traces of the obtained optical materials are shown in Table 3. Since the compound (b) was not used, mold release characteristics were deteriorated and peeling traces were generated.

TABLE 3

| Examples Comparative Examples | Composition (parts by weight) | | | | Mold X | | Mold Y | |
|---|---|---|---|---|---|---|---|---|
| | a-1 | b-1 | c-1 | d-1 | mold release characteristics | peeling traces | mold release characteristics | peeling traces |
| Example 12 | 76.35 | 0.05 | 9.1 | 14.5 | A | B | A | B |
| Example 13 | 75.7 | 0.7 | 9.1 | 14.5 | A | A | A | A |
| Example 14 | 72.4 | 4 | 9.1 | 14.5 | A | A | A | A |
| Example 15 | 68.4 | 8 | 9.1 | 14.5 | B | A | B | B |
| Example 16 | 65.4 | 11 | 9.1 | 14.5 | B | B | B | C |
| Comparative Example 3 | 76.4 | 0 | 9.1 | 14.5 | D | D | D | D |

Example 17

1464 g (10 mol) of bis(β-epoxypropyl)sulfide, 3048 g (40 mol) of thiourea and 120 g (1.2 mol) of acetic anhydride were fed together with 10 L of toluene and 10 L of methanol as solvents, the mixture was reacted at 20° C. for 5 hours and washed with 10% aqueous solution of sulfuric acid before the reaction was completed, and then the mixture was washed with water and the solvents were distilled away. The obtained compound was in an amount of 1520 g, and when it was analyzed by liquid chromatograph, it was a mixture in which the compound (a-1):the compound (b-1)=96:4.

The process was carried out in a manner similar to that in Example 1 using 79 parts by weight of the mixture, 7 parts by weight of (c) the compound (c-1) and 14 parts by weight of (d) the compound (d-1). The results regarding mold release characteristics and peeling traces of the obtained optical materials are shown in Table 4.

Comparative Example 4

1464 g (10 mol) of bis(β-epoxypropyl)sulfide, 3048 g (40 mol) of thiourea and 120 g (1.2 mol) of acetic anhydride were fed together with 10 L of toluene and 10 L of methanol as solvents, the mixture was reacted at 30° C. for 10 hours and washed with 10% aqueous solution of sulfuric acid after the reaction was completed, and then the mixture was washed with water and the solvents were distilled away. The obtained compound was in an amount of 1515 g, and when it was analyzed by liquid chromatograph, it was the compound (a-1), and the compound (b-1) was not detected.

The process was carried out in a manner similar to that in Example 1 using 79 parts by weight of (a) the obtained compound (a-1), 7 parts by weight of (c) the compound (c-1) and 14 parts by weight of (d) the compound (d-1). The results regarding mold release characteristics and peeling traces of the obtained optical materials are shown in Table 4. Since the compound (b) was not used, mold release characteristics were deteriorated and peeling traces were generated.

Example 18

1464 g (10 mol) of bis(β-epoxypropyl)sulfide, 3048 g (40 mol) of thiourea and 120 g (1.2 mol) of acetic anhydride were fed together with 10 L of toluene and 10 L of methanol as solvents, the mixture was reacted at 20° C. for 5 hours and washed with 10% aqueous solution of sulfuric acid before the reaction was completed, and then the mixture was washed with water and the solvents were distilled away. The obtained compound was in an amount of 1520 g, and when it was analyzed by liquid chromatograph, it was a mixture in which the compound (a-1):the compound (b-1)=96:4.

The process was carried out in a manner similar to that in Example 7 using 78.5 parts by weight of the mixture, 7.2 parts by weight of (c) the compound (c-2) and 14.3 parts by weight of (d) the compound (d-1). The results regarding mold release characteristics and peeling traces of the obtained optical materials are shown in Table 5.

Comparative Example 5

1464 g (10 mol) of bis(β-epoxypropyl)sulfide, 3048 g (40 mol) of thiourea and 120 g (1.2 mol) of acetic anhydride were fed together with 10 L of toluene and 10 L of methanol as solvents, the mixture was reacted at 30° C. for 10 hours and washed with 10% aqueous solution of sulfuric acid after the reaction was completed, and then the mixture was washed with water and the solvents were distilled away. The obtained compound was in an amount of 1515 g, and when it was analyzed by liquid chromatograph, it was the compound (a-1), and the compound (b-1) was not detected.

The process was carried out in a manner similar to that in Example 7, except that 78.5 parts by weight of (a) the obtained compound (a-1), 7.2 parts by weight of (c) the compound (c-2) and 14.3 parts by weight of (d) the compound (d-1) were used. The results regarding mold release characteristics and peeling traces of the obtained optical materials are shown in Table 5. Since the compound (b) was not used, mold release characteristics were deteriorated and peeling traces were generated.

TABLE 4

| Examples Comparative Examples | Composition (parts by weight) | | | | Mold X | | Mold Y | |
|---|---|---|---|---|---|---|---|---|
| | a-1 | b-1 | c-1 | d-1 | mold release characteristics | peeling traces | mold release characteristics | peeling traces |
| Example 17 | 75.84 | 3.16 | 7 | 14 | A | A | A | A |
| Comparative Example 4 | 79 | 0 | 7 | 14 | D | D | D | D |

TABLE 5

| Examples Comparative Examples | Composition (parts by weight) | | | | Mold X | | Mold Y | |
|---|---|---|---|---|---|---|---|---|
| | a-1 | b-1 | c-2 | d-1 | mold release characteristics | peeling traces | mold release characteristics | peeling traces |
| Example 18 | 75.36 | 3.14 | 7.2 | 14.3 | A | A | A | A |
| Comparative Example 5 | 78.5 | 0 | 7.2 | 14.3 | D | D | D | D |

Example 19

1464 g (10 mol) of bis(β-epoxypropyl)sulfide, 3048 g (40 mol) of thiourea and 120 g (1.2 mol) of acetic anhydride were fed together with 10 L of toluene and 10 L of methanol as solvents, the mixture was reacted at 20° C. for 5 hours and washed with 10% aqueous solution of sulfuric acid before the reaction was completed, and then the mixture was washed with water and the solvents were distilled away. The obtained compound was in an amount of 1520 g, and when it was analyzed by liquid chromatograph, it was a mixture in which the compound (a-1):the compound (b-1)=96:4.

The process was carried out in a manner similar to that in Example 12 using 76.4 parts by weight of the mixture, 9.1 parts by weight of (c) the compound (c-1) and 14.5 parts by weight of (d) the compound (d-1). The results regarding mold release characteristics and peeling traces of the obtained optical materials are shown in Table 6.

Comparative Example 6

1464 g (10 mol) of bis(β-epoxypropyl)sulfide, 3048 g (40 mol) of thiourea and 120 g (1.2 mol) of acetic anhydride were fed together with 10 L of toluene and 10 L of methanol as solvents, the mixture was reacted at 30° C. for 10 hours and washed with 10% aqueous solution of sulfuric acid after the reaction was completed, and then the mixture was washed with water and the solvents were distilled away. The obtained compound was in an amount of 1515 g, and when it was analyzed by liquid chromatograph, it was the compound (a-1), and the compound (b-1) was not detected.

The process was carried out in a manner similar to that in Example 12, except that 76.4 parts by weight of (a) the obtained compound (a-1), 9.1 parts by weight of (c) the compound (c-1) and 14.5 parts by weight of (d) the compound (d-1) were used. The results regarding mold release characteristics and peeling traces of the obtained optical materials are shown in Table 6. Since the compound (b) was not used, mold release characteristics were deteriorated and peeling traces were generated.

TABLE 6

| Examples Comparative Examples | Composition (parts by weight) | | | | Mold X | | Mold Y | |
|---|---|---|---|---|---|---|---|---|
| | a-1 | b-1 | c-1 | d-1 | mold release characteristics | peeling traces | mold release characteristics | peeling traces |
| Example 19 | 73.34 | 3.06 | 9.1 | 14.5 | A | A | A | A |
| Comparative Example 6 | 76.4 | 0 | 9.1 | 14.5 | D | D | D | D |

The invention claimed is:

1. A composition for optical materials, which comprises a compound (a) below, a compound (b) below, a polythiol (c) and sulfur (d):

the compound (a): a compound having the structure represented by the following formula (1):

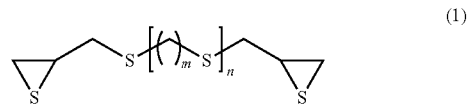

wherein m represents an integer from 0 to 4, and n represents an integer from 0 to 2; and the compound (b): a compound having the structure represented by the following formula (2):

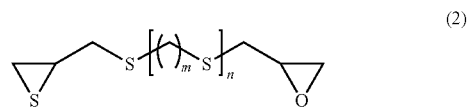

wherein m represents an integer from 0 to 4, and n represents an integer from 0 to 2.

2. The composition for optical materials according to claim 1, wherein the polythiol (c) is at least one compound selected from the group consisting of bis(2-mercaptoethyl) sulfide, 2,5-dimercaptomethyl-1,4-dithiane, 1,3-bis(mercaptomethyl)benzene, 1,4-bis(mercaptomethyl)benzene, 4-mercaptomethyl-1,8-dimercapto-3,6-dithiaoctane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,3,3-tetrakis(mercaptomethylthio)propane, pentaerythritol tetrakis-mercaptopropionate, pentaerythritol tetrakis-thioglycolate, trimethylolpropane tris(thioglycolate) and trimethylolpropane tris(mercapto propionate).

3. The composition for optical materials according to claim 1, wherein, when the total amount of the compound (a), the compound (b), the polythiol (c) and sulfur (d) is 100% by mass, the compound (a) is in an amount of 50 to 90% by mass; the compound (b) is in an amount of 0.05 to 20% by mass; the polythiol (c) is in an amount of 1 to 20% by mass; and sulfur (d) is in an amount of 8 to 50% by mass.

4. A method for producing an optical material, which comprises adding a prepolymerization catalyst to the composition for optical materials according to claim 1 for preliminarily reacting the compound (a), the compound (b), the polythiol (c) and sulfur (d) in an amount of 0.0001 to 10% by mass relative to the total amount of (a) to (d).

5. A method for producing an optical material, which comprises adding a polymerization catalyst to the composition for optical materials according to claim 1 to be polymerized and cured in an amount of 0.0001 to 10% by mass relative to the total amount of (a) to (d).

6. An optical material obtained by the production method according to claim 5.

7. An optical lens comprising the optical material according to claim 6.

8. A method for producing the composition for optical materials according to claim 1, which comprises:

reacting an epoxy compound represented by formula (3) below with thiourea to obtain a mixture of the compound (a) and the compound (b); and mixing the mixture with the polythiol (c) and the sulfur (d):

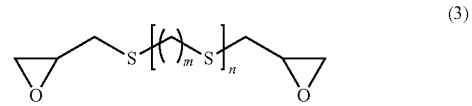

(3)

wherein m represents an integer from 0 to 4, and n represents an integer from 0 to 2.

* * * * *